US009556305B2

(12) United States Patent
Kung

(10) Patent No.: US 9,556,305 B2
(45) Date of Patent: Jan. 31, 2017

(54) NON-CYTOTOXIC URETHANE ELASTOMER

(71) Applicant: Crosslink Technology Inc., Mississauga (CA)

(72) Inventor: Jimmy Kung, Brampton (CA)

(73) Assignee: Crosslink Technology Inc., Mississauga (CA)

( * ) Notice: Subject to any disclaimer, the term of this patent is extended or adjusted under 35 U.S.C. 154(b) by 127 days.

(21) Appl. No.: 14/252,281

(22) Filed: Apr. 14, 2014

(65) Prior Publication Data

US 2015/0291727 A1   Oct. 15, 2015

(51) Int. Cl.
  *C08K 5/5419*   (2006.01)
  *C08G 18/22*   (2006.01)
  *C08G 18/48*   (2006.01)
  *C08G 18/76*   (2006.01)

(52) U.S. Cl.
  CPC ......... *C08G 18/7621* (2013.01); *C08G 18/222* (2013.01); *C08G 18/4808* (2013.01); *C08G 18/4825* (2013.01); *C08G 18/4866* (2013.01); *C08K 5/5419* (2013.01)

(58) Field of Classification Search
  CPC .............. C08G 18/7621; C08G 18/222; C08G 18/4825; C08G 18/4866; C08G 18/4808; C08K 5/5419
  See application file for complete search history.

(56) References Cited

U.S. PATENT DOCUMENTS

| 3,730,943 | A | * | 5/1973 | Weisfeld | C07C 53/128 426/106 |
|---|---|---|---|---|---|
| 4,332,927 | A | | 6/1982 | Simone | |
| 4,552,944 | A | * | 11/1985 | Kamiyama | C08G 18/222 528/55 |
| 5,306,798 | A | | 4/1994 | Horn et al. | |
| 6,030,530 | A | | 2/2000 | Esposito et al. | |
| 6,214,290 | B1 | | 4/2001 | Esposito | |
| 2003/0162933 | A1 | * | 8/2003 | Hippold | C08F 283/006 528/44 |
| 2007/0078253 | A1 | * | 4/2007 | Ulbrich | B29C 37/0032 528/44 |

FOREIGN PATENT DOCUMENTS

JP   10-147706   *   6/1998

OTHER PUBLICATIONS

English abstract of JP 10-147706, Nakauchi et al., Jun. 1998.*

* cited by examiner

*Primary Examiner* — Patrick Niland
(74) *Attorney, Agent, or Firm* — Walker & Jocke

(57) ABSTRACT

A non-cytotoxic polyether polyurethane elastomer is made by reacting a polyether triol, polyether diol, and polyether prepolymer terminated with toluene diisocyanate. The reaction is catalyzed with a zinc based catalyst, such as zinc neodecanoate. Silicone oil is also added to the reactants. The polyurethane elastomer is a solid, soft elastomer having a hardness of from 15 Shore 00 to 50 Shore A. The elastomer is particularly suited for use as padding in sleeves, splints and braces where it is in contact with human skin.

23 Claims, No Drawings

NON-CYTOTOXIC URETHANE ELASTOMER

FIELD OF THE INVENTION

This invention relates to urethane elastomers which are non-cytotoxic. This invention also relates to processes to produce the non-cytotoxic urethane elastomers and articles made with the elastomers.

BACKGROUND OF THE INVENTION

Urethane polymers are thermostable, durable, and can be manufactured with a very broad range of hardness. Many different reactants can be used to make urethane polymers. As such, urethane polymers can be used in a wide variety of applications. For example, urethane elastomers have particularly good impact absorption and wear resistance characteristics and can be manufactured to virtually any desired shape and flexibility, making them good candidates for many padding applications.

However, conventional urethanes contain toxic materials that would harm cells that are subjected to prolonged contact with the urethane. The other characteristics make elastomeric urethanes well suited for padding, for example in medical applications, such as in sleeves, splints and braces. The cytotoxicity of urethanes precludes their use in applications requiring direct contact with the skin without a protective layer to form a barrier against the cytotoxic effects of the urethane. The addition of a protective layer complicates the process of manufacturing articles such as sleeves, splints and braces. Using a protective layer also adds another component that can wear with time, and potentially provide a surface where dirt, microbes or other biological hazards, such as fungus and mold, can accumulate raising cleanliness issues.

For this reason, elastomeric silicone is currently the material of choice for skin contact applications where elastomeric properties are desirable. Silicone elastomers are flexible, durable and non-toxic, making them an ideal candidate for applications requiring human skin contact. However, silicone is costly and therefore very expensive to use in large quantities.

There is a long felt need to make a urethane elastomer which is non-cytotoxic and flexible such that it can be used in applications having contact with human skin, such as padding for sleeves, splints, braces and the like.

SUMMARY OF THE INVENTION

A general aspect of the current invention is to provide a polyurethane elastomer composition which is non-cytotoxic. The polyurethane elastomer when crosslinked is a solid material and is generally considered soft. The polyurethane elastomer has a hardness of from 15 Shore 00 to 50 Shore A, preferably from 20 Shore 00 to 70 Shore 00, and more preferably from 30 Shore 00 to 50 Shore 00, as determined according to ASTM D2240.

The non-cytotoxic polyurethane elastomer composition is the reaction product of (1) at least one hydroxyl terminated polyether, (2) at least one hydroxyl terminated polyether diol, and (3) at least one polyether prepolymer.

The at least one hydroxyl terminated polyether has a functionality of greater than 2, preferably 3, and has a number average molecular weight of from about 400 to about 1,000, preferably from about 500 to about 700 Daltons. The hydroxyl terminated polyether is preferably a triol.

The at least one hydroxyl terminated polyether diol preferably has a functionality of about 2 and has a number average molecular weight of from about 4,000 to about 12,000, preferably from about 6,000 to about 10,000 Daltons.

The at least one polyether prepolymer is a polyether terminated with a diisocyanate, preferably toluene diisocyanate. It is also preferred that the diisocyanate terminated prepolymer have a very low level of free diisocyanate. Levels of free diisocyanates should be less than 1.0 wt. percent, preferably less than 0.1 weight percent.

The reaction of the three ingredients mentioned above is catalyzed with at least one zinc based catalyst. The zinc based catalyst is preferably primarily zinc neodecanote and can contain about 10% by weight of zinc oxide. The amount of catalyst used is from about 0.25 to 0.6 weight percent, preferably from about 0.3 to 0.5 weight percent, and more preferably from about 0.3 to about 0.4 weight percent based on the total weight of the polyurethane elastomer composition.

The level of the at least one hydroxyl terminated polyether having a functionality of greater than 2 used is from about 5 to about 12 weight percent, preferably from about 7 to about 8.5 weight percent of the total weight of the polyurethane elastomer composition.

The level of the at least one hydroxyl terminated polyether diol is from about 55 to about 75 weight percent, preferably from about 65 to about 70 weight percent of the total weight of the polyurethane elastomer composition.

The level of the at least one polyether prepolymer is from about 15 to about 30 weight percent, preferably from about 20 to about 25 weight percent of the total weight of the polyurethane elastomer composition.

The polyurethane elastomer composition can contain other ingredients as long as they do not impact the non-cytotoxic nature of the composition. Ingredients such as fillers, colorants, and the like can be used but preferably at very low levels to enhance processing. One useful additional ingredient that is preferably used is silicone oil. Silicone oil is used at a level of from about 0.3 to about 1.5 weight percent, preferably from about 0.6 to about 0.9 weight percent of the total weight of the polyurethane elastomer composition. The silicone oil aids in the processing, such as in the demolding when the composition is used to make an end use article.

The non-cytotoxic polyurethane elastomer can be produced by adding the polyether triol to a mixing vessel and heating the polyether triol to a temperature of from about 100° C. to about 120° C. while mixing under vacuum for about 10 to about 20 minutes. The polyether diol is then added to the mixing vessel and mixed under vacuum for another 3 to 10 minutes. The mixture of the polyether triol and polyether diol is then cooled to less than about 40° C. After the mixture is cooled the zinc based catalyst and the silicone oil are added and mixing continues under vacuum for about 20 to 40 minutes. The mixture can then be packaged under nitrogen and stored for later use as one part of a two part system to make the final composition.

To the mixture described above containing the triol, diol, catalyst, and silicone oil, the polyether prepolymer is added and the mixture is blended under vacuum, poured into molds, and then heated to a temperature of from about 70° C. to about 110° C. for a time sufficient to crosslink and cure the composition to form a polyurethane elastomer with a hardness of from 15 Shore 00 to 50 Shore A. The polyether prepolymer can be packaged under nitrogen and stored for later use as the second part of a two part system. The final curing step is preferably at a temperature of from about 78° C. to about 82° C. for a time of from 14 to 18 hours to form the crosslinked polyurethane elastomer.

After all the ingredients have been mixed as shown above, the composition can be poured into a mold and cured to make the desired end use product, such as padding for a sleeve, splint or braces. The composition is used in articles where the elastomer has at least a portion of one surface in contact with unprotected skin.

DETAILED DESCRIPTION OF EXEMPLARY EMBODIMENTS OF THE INVENTION

Exemplary embodiments in accordance with the present invention will be described. Various modifications, adaptations or variations of the exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

The methods and compositions of the present invention may suitably comprise, consist of, or consist essentially of the components, ingredients, elements, steps and process delineations described herein. The invention disclosed herein suitability may be practiced in the absence of any element, process step, or ingredient which is not specifically disclosed herein.

Unless otherwise stated, all percentages, parts, and ratios expressed herein are based upon weight of the total compositions of the present invention.

The headings provided herein serve to illustrate, but not to limit the invention in any way or manner.

An important feature of the polyurethane elastomer compositions of the present invention is that they are non-cytotoxic. Cytotoxic compositions can cause serious harm to human skin if the cytotoxic materials are in contact with the skin for extended periods of time. Exposing cells to a cytotoxic compound can result in a variety of cell fates. The cells may undergo necrosis, in which they lose membrane integrity and die rapidly as a result of cell lysis. The cells can stop actively growing and dividing (a decrease in cell viability), or the cells can activate a genetic program of controlled cell death (apoptosis). Cells undergoing necrosis typically exhibit rapid swelling, lose membrane integrity, shut down metabolism and release their contents into the environment.

An accepted test to determine if a composition is cytotoxic or non-cytotoxic is to perform the test using the Minimum Essential Medium (MEM) elution method. The test uses a monolayer of L-929 mouse fibroblast cells grown to sub-confluency in the presence of 5% $CO_2$ for the test and exposed to the test sample. A test sample of the polyurethane is covered with a single Minimum Essential Medium supplemented with 5% serum and 2% antibiotics (1×MEM). A single preparation is extracted with agitation at 37° C. for 24 hours. The cells are examined microscopically for cytotoxic effect.

There are commercial laboratories that can perform the cytotoxic test. One of these labs is North American Science Association (NAMSA) located in Northwood, Ohio.

The first essential reactant of the non-cytotoxic polyurethane elastomer is at least one hydroxyl terminated polyether polyol. This polyol will have a functionality of greater than 2 and preferably 3. This polyether polyol is preferably a triol, that is it has three hydroxyl groups. Two of the hydroxyl groups are found on the ends (one on each end) which are primary hydroxyl groups. The third hydroxyl group is a secondary hydroxyl group and found along the chain of the polyether. The functionality of greater than 2 allows the polyol to enhance the crosslinking of the final composition.

Hydroxyl terminated polyether polyols are typically derived from a diol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. The hydroxyl terminated polyether polyols having a functionality of greater than 2 are commercially available from several suppliers. A particular preferred polyether polyol is a triol having a number average molecular weight of 600 sold by Arch Chemicals under the name of Poly G30-280. A mixture of two or more hydroxyl terminated polyether polyols having a functionality of greater than 2 can be used in this invention. The hydroxyl polyether polyol will have a number average molecular weight of from about 400 to about 1,000, preferably from about 500 to about 700 Daltons.

The level of the at least one hydroxyl terminated polyether having a functionality of greater than 2 used in the polyurethane composition of this invention is from about 5 to about 12 weight percent, preferably from about 7 to about 8.5 weight percent of the total weight of the polyurethane elastomer composition.

The second essential reactant of the non-cytotoxic polyurethane elastomer is at least one hydroxyl terminated polyether diol. Hydroxyl terminated polyether diols are typically derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran (PTMG). Copolyethers can also be utilized in the current invention. Typical copolyethers include the reaction product of tetrahydrofuran and ethylene oxide or tetrahydrofuran and propylene oxide. These are available from BASF as PolyTHFB, a block copolymer, and PolyTHFR, a random copolymer. The various polyether polyols acceptable for use in this invention have a number average molecular weight (Mn), as determined by assay of the terminal functional groups which is an average molecular weight of from about 4,000 to about 12,000, preferably from about 6,000 to about 10,000 Daltons. A particular preferred polyether diol polyol is a diol having a number average molecular weight of about 8,000 Daltons sold by Bayer as Acclaim 8200. A mixture of two or more hydroxyl terminated polyether diols can be used in this invention.

The level of the polyether diol used in the non-cytotoxic polyurethane elastomer composition is from about 55 to about 75 weight percent, preferably from 65 to about 70 weight percent of the total weight of the polyurethane elastomer composition.

The third essential reactant to make the non-cytotoxic polyurethane elastomer of this invention is at least one polyether prepolymer terminated with a diisocyanate. The prepolymer is formed by reacting a polyether diol with a diisocyanate such that the polyether is end capped with an isocyanate group (NCO). Suitable diisocyanates include aromatic diisocyanates such as: 4,4'-methylenebis-(phenyl isocyanate) (MDI); m-xylylene diisocyanate (XDI); phenylene-1,4-diisocyanate and toluene diisocyanate (TDI); as well as aliphatic diisocyanates such as isophorone diisocyanate (IPDI), 1-4-cyclohexyl diisocyanate (CDHI), decane-1,10-diisocyanate, and dicyclohexylmethane,4,4'-diisocyanate. The most preferred diisocyanate is toluene diisocyanate (TDI) which is sold in two isomers (2,4 and 2,6 TDI). The 2,4 isomer of TDI is more reactive than the 2,6 isomer. Commercial TDI is usually an 80/20 mixture of the 2,4 and 2,6 isomers. It is also important that the polyether prepolymer have a very low amount of residual unreacted diisocyanate. The diisocyanate should have a level of free isocyanate less than about 1% and preferably less than 0.1% free isocyanate. A particularly preferred polyether prepolymer is available from Chemtura as Adiprene LF 751D.

The level of polyether prepolymer used in the non-cytotoxic polyurethane elastomer is from about 15 to about 30 weight percent, preferably from about 20 to about 25 weight percent of the total weight of the polyurethane elastomer composition. A mixture of two or more polyether prepolymers may be used in the current invention.

A fourth necessary ingredient to make the non-cytotoxic polyurethane elastomer composition is a polyurethane catalyst. The catalyst selection is very important in that some catalysts can cause the composition to be cytotoxic. The preferred catalyst is a zinc based catalyst. The zinc based catalyst is preferably zinc neodecanote and can contain about 10% by weight of zinc oxide. The amount of zinc based catalyst used is from about 0.25 to about 0.6 weight percent, preferably from about 0.3 to about 0.5 weight percent, and more preferably from about 0.3 to about 0.4 weight percent based on the total weight of the polyurethane elastomer composition. The preferred zinc catalyst is one sold by Shepherd Chemical as Bicat Z.

The polyurethane elastomer composition can contain other ingredients, such as colorants, fillers, and the like to enhance processing as long as they do not impact the non-cytotoxic properties of the compositions. One useful additional ingredient that is preferable when making a molder article is silicone oil. Silicone oil is used at a level of from about 0.3 to about 1.5 weight percent, preferably from about 0.6 to about 0.9 weight percent of the total weight of the polyurethane elastomer composition. A particularly preferred silicone oil is DC 200 Fluid 350 CS from Dow Corning. A mixture of two or more silicone oils may be used. The silicone oil aids in the processing, such as in the demolding step when the composition is used to make an end use article.

A preferred method to produce the non-cytotoxic polyurethane composition is to first add the hydroxyl terminated polyether (hereinafter triol) having a functionality greater than 2 to a vessel equipped with mixing device and a vacuum port and heating the triol to a temperature of from about 100° C. to about 120° C. while mixing under vacuum for about 10 to about 20 minutes. The polyether diol is then added to the mixing vessel containing the heated triol and mixed under vacuum for another 10 to 20 minutes. The mixture of the polyether triol and polyether diol is then cooled to less than about 40° C. After the mixture of polyether triol and polyether diol is cooled to less than 40° C., the zinc based catalyst and the silicone oil, if used, are added to the mixing vessel and mixing continued under vacuum for about 20 to 40 minutes. The mixture can then be packaged under nitrogen and stored for later use as one part of a two part system to make the final composition. It is important to not add the catalyst without first cooling the mixture to below 40° C. or reduced catalyst activity can occur.

To form the second part of the two part system, the polyether prepolymer is packaged under nitrogen and can be stored for later use.

To form the non-cytotoxic polyurethane composition of this invention, the first part of the two part system (triol, diol, catalyst and silicone oil) is combined in the mixing vessel with the second part (prepolymer) and the mixture is mixed under vacuum, poured into prepared molds, and is then heated to a temperature of from about 70° C. to about 110° C., preferably from 78° C. to 82° C., for a time sufficient to crosslink the composition to form a polyurethane elastomer with a hardness of from 15 Shore 00 to 50 Shore A. The time required to crosslink the composition to a hardness of from 20 to 50 Shore 00 is about 14 to 18 hours. It is well understood by those skilled in the art of making polyurethane compositions that the time to crosslink and the hardness can be adjusted by the selection of the reactants and the level of catalyst used, as well as the curing temperature used.

As is well understood by those skilled in the art, if the composition is going to be used quickly to make a product the steps of packaging the two parts can be eliminated by adding the prepolymer directly to the mixture of triol, diol, catalyst and silicone oil and mixed. This approach might be preferred by a large user of the composition that wanted to make several end use articles in a short time frame. The composition, when molded, should be added to the mold within one hour after final mixing or the mixture may be too crosslinked to pour into the mold.

The compositions of this invention have a hardness of from 15 Shore 00 to 50 Shore A as determined according to ASTM D2240, preferably from about 20 Shore 00 to 70 Shore 00. The Shore durometer has several scales such that they can measure materials from very soft to very hard. The Shore 00 scale is used for relatively softer materials and the Shore A scale is used for intermediate hardness. Each scale has a range from 0 to 100, but when approaching either end of a scale it is advisable to switch to a different scale. Some common materials and their Shore hardness are: Chewing gum—20 Shore 00; rubber band—25 Shore A; automotive tire tread—70 Shore A. As mentioned above, there is overlap in the various scales for Shore hardness. For example, a 5 Shore A is equivalent to a 45 Shore 00 and a 50 Shore A is equivalent to a 90 Shore 00.

The final non-cytotoxic polyurethane composition of this invention is a thermoset polyurethane, that is it is cross-linked. The polyether polyol with greater than 2 functionality combined with the polyether prepolymer results in crosslinking. The polyurethane composition is a solid material, as opposed to a lot of soft materials which are foams, that is they have a cellular structure. The hardness of the composition can be adjusted, as is well understood by those skilled in the art. For example, increasing the amount of diol will make the composition softer, and likewise decreasing the amount of diol will make the composition harder.

The following example is intended to show the preferred embodiment to make the polyurethane composition of this invention and not to be limiting to the invention as claimed.

Example

This example is presented to demonstrate the making of a 45 Shore 00 (5 Shore A) polyurethane elastomer composition using the two component system (Part A and Part B) and mixing the two parts together to form the final composition. Table 1 below shows the formulation for Part A.

TABLE 1

| (Part A) | | | |
|---|---|---|---|
| Ingredient | Weight (Kg) | Wt. % of Part A | Wt. % of Final Composition |
| 600 Mn Triol[1] | 100.00 | 10.0% | 7.75% |
| 8000 Mn Diol[2] | 885.00 | 88.5% | 68.60% |
| Zinc Catalyst[3] | 5.00 | 0.5% | 0.3375% |
| Silicone Oil[4] | 10.00 | 1.0% | 0.775% |
| Total | 1,000.00 | 100.0% | 77.4625% |

[1]Polyester Triol (Poly G30-280 from Arch Chemicals)
[2]Polyester Diol (Acclaim 8200 from Bayer)
[3]Zinc neodecanoate having about 10% zinc oxide (Bicat Z from Shepherd Chemical)
[4]DC 200 Fluid 350 CS from Dow Corning Process to Produce Part A Step 1—Add polyether triol to a mixing vessel. Heat to 110° C. Mix under vacuum for 15 minutes.

Step 2—Add polyether diol to the mixing vessel containing the triol and mix under vacuum for 5 minutes.

Step 3—Cool the mixture of the triol and diol to less than 40° C.

Step 4—Add catalyst and silicone oil to the cooled mixture and mix for 30 minutes under vacuum.

Step 5—After quality control approval, filter and package under nitrogen to be used later as Part A.

Part B Preparation

Part B is prepared by packaging under nitrogen a low free toluene diisocyanate polyether prepolymer (Adiprene LF 751D from Chemtura).

Final Composition—Part A+Part B Preparation

To make the final composition 100 weight parts of Part A is mixed with 29 weight parts of Part B. The mixture of Part A and Part B is mixed under vacuum to blend and remove air, poured into molds, and heated to 80° C. and cured for 16 hours to crosslink the composition to form the non-cytotoxic polyurethane elastomer.

Cytotoxicity Testing

A sample of the above composition was submitted to North American Science Association in Northwood, Ohio for cytotoxicity testing. The test performed was the Minimum Essential Medium (MEM) elution method using a monolayer of L-929 mouse fibroblast cells grown to sub-confluency in the presence of 5% $CO_2$ and 95% air. A test sample of the polyurethane was covered with a Single Minimum Essential Medium supplemented with 5% serum and 2% antibiotics (1×MEM). A single preparation was extracted with agitation at 37° C. for 24 hours. The cells were examined microscopically for cytotoxic effect. To determine cytotoxic effect the presence or absence of a confluent monolayer was checked along with vacuolization, cellular swelling, crenation and the percent of cellular lysic was recorded. The test results showed no vacuolization, no swelling, no crenation and 0% lysic. The sample was deemed to be non-cytotoxic to L-929 mouse fibroblast cells.

A positive (cytotoxic) and negative (non-cytotoxic) controls were tested and both performed as expected.

Various embodiments of the present invention having been thus described in detail in this specification and example, it will be apparent to those skilled in the art that variations and modifications may be made without departing from the invention. The invention includes all such variations and modifications as fall within the scope of the appended claims.

The invention claimed is:

1. A non-cytotoxic crosslinked soft polyurethane elastomer composition comprising the reaction product of:
   (a) at least one hydroxyl terminated polyether, wherein said polyether has a functionality of greater than 2, and wherein said polyether is a triol having a number average molecular weight of from 500 to 700 Daltons, said polyether triol being present at a level of from 5 to 12 weight percent, based on the total weight of said composition;
   (b) at least one hydroxyl terminated polyether diol, wherein said diol has a number average molecular weight of from 4,000 to 12,000 Daltons;
   (c) at least one polyether prepolymer terminated with a diisocyanate; and
   (d) at least one zinc based catalyst suitable to react (a), (b) and (c) above to form a crosslinked soft polyurethane elastomer, wherein the zinc based catalyst is present at a level of from 0.25 to 0.6 weight percent of said composition;
   wherein said crosslinked soft polyurethane elastomer composition has a hardness from 15 Shore 00 to 50 Shore A, as determined according to ASTM D2240.

2. The crosslinked soft polyurethane elastomer composition of claim 1 further comprising from 0.3 weight percent to 1.5 weight percent of at least one silicone oil, based on the total weight of the composition.

3. The crosslinked soft polyurethane elastomer composition of claim 1, wherein the hydroxyl terminated polyether diol in (b) has a number average molecular weight of from 6,000 to 10,000 Daltons.

4. The crosslinked soft polyurethane elastomer composition of claim 1, wherein the diisocyanate in (c) is toluene diisocyanate.

5. The crosslinked soft polyurethane elastomer composition of claim 4, wherein the polyether prepolymer has less than 0.1 weight percent free toluene diisocyanate.

6. The crosslinked soft polyurethane elastomer composition of claim 1, wherein the hardness is from 20 Shore 00 to 20 Shore A.

7. The crosslinked soft polyurethane elastomer composition of claim 1, wherein the hardness is from 20 Shore 00 to 70 Shore 00.

8. The crosslinked soft polyurethane elastomer composition of claim 3, wherein the hydroxyl terminated polyether diol is present at a level of from 55 to 75 weight percent, based on the total weight of said composition.

9. The crosslinked soft polyurethane elastomer composition of claim 5, wherein the polyether prepolymer is present at a level of from 15 to 30 weight percent, based on the total weight of said composition.

10. A non-cytotoxic crosslinked soft polyurethane elastomer composition comprising the reaction product of:
  (a) from 7.0 to 8.5 weight percent of at least one hydroxyl terminated polyether triol, said triol having a number average molecular weight from 500 to 700 Daltons;
  (b) from 65 to 70 weight percent of at least one hydroxyl terminated polyether diol, said diol having a number average molecular weight from 7,000 to 9,000 Daltons;
  (c) from 20 to 25 weight percent of at least one polyether prepolymer terminated with toluene diisocyanate, wherein said prepolymer has less than 0.1 weight percent of free toluene diisocyanate;
  (d) from 0.3 to 0.4 weight percent of zinc neodecanoate catalyst;
  said weight percents based on 100 weight percent of the reactants (a)+(b)+(c)+(d); wherein said composition comprises from 0.6 to 0.9 weight percent of silicone oil; and wherein said crosslinked soft polyurethane elastomer composition has a Shore 00 hardness of from 2.0 to 70, as determined according to ASTM D 2240.

11. The composition of claim 10 comprising:
  (a) from 7.5 to 8.0 weight percent of said triol;
  (b) from 68 to 70 weight percent of said diol;
  (c) from 22 to 23 weight percent of said prepolymer;
  (d) from 0.3 to 0.4 weight percent of said zinc neodecanoate catalyst; and
  (e) from 0.7 to 0.8 weight percent of said silicone oil.

12. A non-cytotoxic article made from the composition of claim 1 and when in use has one surface in contact with human skin.

13. The non-cytotoxic article of claim 12, wherein said article is a molded article.

14. A non-cytotoxic article made from the composition of claim 11.

15. A process for producing a non-cytotoxic crosslinked soft polyurethane elastomer composition comprising:
  (a) adding at least one hydroxyl terminated polyether to a mixing vessel, wherein said polyether has a functionality of greater than 2 and a number average molecular weight of from 400 to 1,000 Daltons;
  (b) heating said polyether in (a) to a temperature of from 100° C. to 120° C. while mixing under vacuum for 10 to 20 minutes;
  (c) adding at least one hydroxyl terminated polyether diol to said mixing vessel containing the polyether (a), wherein said polyether diol has a number average molecular weight of from 4,000 to 12,000 Daltons;
  (d) mixing the mixture of (a)+(c) for 3 to 10 minutes under vacuum;
  (e) cooling the mixture of (a)+(c) to less than 40° C.;
  (f) adding to said cooled mixture at least one zinc based catalyst and at least one silicone oil;
  (g) mixing said mixture under vacuum for 20 to 40 minutes;
  (h) adding to said mixture of (a), (c) and (f) at least one polyether prepolymer terminated with a diisocyanate; and
  (i) heating said mixture of (a), (c), (f) and (h) to a temperature of from 70° C. to 110° C. for a time sufficient to crosslink the composition to form a polyurethane elastomer with a hardness of from 15 Shore 00 to 50 Shore A, as determined by ASTM D2240.

16. The process of claim 15, wherein the ingredients (a), (c) and (f) form the first part of a two part system, and ingredient (h) forms the second part of the two part system.

17. The process of claim 16, wherein each of the first part and second part are packaged separately under nitrogen for use at a later time.

18. The process of claim 16, wherein for every 100 parts by weight of the first part of the mixture, from 25 to 35 parts by weight of the second part is mixed with the first part.

19. The process of claim 18, wherein the hydroxyl terminated polyether with a functionality of greater than 2 in claim 15(a) is a triol.

20. The process of claim 19, wherein the polyether prepolymer in claim 15(h) is terminated with toluene diisocyanate, and wherein said prepolymer has less than 0.1 weight percent free toluene diisocyanate.

21. The process of claim 15, wherein the mixture in (i) is heated to a temperature of from 78° C. to 82° C. for a time of from 14 to 18 hours to form a polyurethane elastomer having a hardness of from 20 to 50 Shore 00.

22. The process of claim 18, wherein after the mixing of the first part with the second part, the mixture is poured into a mold within 1 hour after being mixed.

23. The process of claim 15 comprising:
  (a) from 7.5 to 8.0 weight percent of said at least one hydroxyl terminated polyether having a functionality of greater than 2, and wherein said hydroxyl terminated polyether is a triol;
  (b) from 68 to 70 weight percent of said diol;
  (c) from 22 to 23 weight percent of said prepolymer;
  (d) from 0.3 to 0.4 weight percent of zinc neodecanoate catalyst; and
  (e) from 0.7 to 0.8 weight percent of said silicone oil.

* * * * *